United States Patent [19]

Morey

[11] 4,065,282
[45] Dec. 27, 1977

[54] METHOD OF RECOVERY OF GLASS FROM MUNICIPAL WASTE

[75] Inventor: Booker W. Morey, Pasadena, Calif.

[73] Assignee: Occidental Petroleum Corporation, Los Angeles, Calif.

[21] Appl. No.: 777,653

[22] Filed: Mar. 15, 1977

Related U.S. Application Data

[63] Continuation of Ser. No. 621,525, Oct. 10, 1975, abandoned, which is a continuation of Ser. No. 464,798, April 29, 1974, abandoned.

[51] Int. Cl.² .............................................. C03B 1/00
[52] U.S. Cl. .......................................... 65/28; 65/62; 65/181; 106/47 R; 106/73.6; 241/24; 241/76
[58] Field of Search ................. 65/18, 19, 28, 62, 181; 106/47 R, 73.6; 241/24, 76

[56] References Cited

U.S. PATENT DOCUMENTS 3,524,594  8/1970  Anderson et al. ................. 241/24 X

OTHER PUBLICATIONS

Sands and Crushed Rocks, vol. 1, by A. B. Searle, published 1923, Henry Frowde, Hodder and Stroughton, The Lancet Bldg., 1 Bedford St., Strand, W. C. 2, pp. 169, 170, 171, 172.

Primary Examiner—Arthur D. Kellogg
Attorney, Agent, or Firm—Max Geldin; William N. Patrick; William G. Lane

[57] ABSTRACT

Process for recovery of glass from municipal waste, comprising shredding the waste, subjecting the shredded waste containing the glass to treatment in an air classifier, recovering the overhead including glass from the air classifier, the latter being operated under conditions such that the major portion of the glass particles contained in such overhead are of a fineness smaller than about 6 mesh, and usually of a size such that a substantial portion of such glass particles are less than about 20 mesh, screening such overhead fraction and recovering an enriched glass fraction of the aforementioned fineness, subjecting the screened glass-enriched material to treatment on an air table, and recovering a fine glass product of substantially reduced organic content, and having a particle size less than about 6 mesh, with a substantial portion less than about 20 mesh. Such fine glass product containing a substantial portion of glass particles of a size less than 20 mesh, can be employed in construction applications, e.g. in admixture with asphalt to form slurry seal, for production of glass and resin binder sheets, and the like, and may be further beneficiated to sufficient purity for recycle to glass manufacture.

17 Claims, 3 Drawing Figures

METHOD OF RECOVERY OF GLASS FROM MUNICIPAL WASTE

This is a continuation of application Ser. No. 621,525 filed Oct. 10, 1975, now abandoned, which in turn is a continuation of application Ser. No. 464,798, filed Apr. 29, 1974, now abandoned.

BACKGROUND OF THE INVENTION

This invention relates to the recovery of glass from municipal waste and trash, and is particularly concerned with procedure for recovery of a fine glass product from municipal waste, which can be used in various industrial applications; and to the novel fine glass produuct thus recovered in the process.

The prior art heretofore has been essentially concerned with recovery of coarse glass from municipal waste or trash. Such coarse grades of glass, and the degree of impurity thereof, have not permitted this type of glass to be employed in many industrial applications, and such coarse and impure grades of glass particularly are not suited for recycle to glass manufacture.

Thus, it is known to shred municipal waste containing glass, and to subject the shredded material to air classification for separation of an overhead or lighter material from the heavier material which falls in the air classifier. Such heavier materials include coarse or large pieces of glass, as well as pieces of metals, rocks and wood. The heavy materials including coarse glass comprising pieces of the order of about ¼ inch to 1 inch in size is then fed to an air table to remove organics such as plastics, rags, heavy paper and the like, and to separate the heavier materials into a glass product comprised of the above-noted coarse glass pieces, the glass product recovered being of a size and degree of impurity unsuitable for use in many industrial applications, or for recycle to glass manufacture, without further substantial and costly processing.

As previously noted, a substantial need has now developed for the recovery of glass from municipal waste and trash in the form of fine glass of substantially reduced organic content and improved purity, for use in industrial applications such as in slurry seal, as a brick additive, in composition resin-glass panels, and the like, and particularly of a grade which by further beneficiation is of sufficient purity for recycle to glass manufacture. Accordingly, it is a particular object of the present invention to produce such fine and relatively higher grade glass product from municipal trash and waste.

DESCRIPTION OF THE INVENTION

It has been found according to the present invention that if shredded waste or trash containing glass is fed to an air classifier, and the overhead lighter material, hereinafter referred to also as "overhead lights", from the air classifier, and including fine glass, is then screened to provide a screened material enriched in such fine glass, and such glass-enriched screened overhead material is separated on an air table, the resulting concentrated glass product separated on such air table, and consisting essentially of glass, and other inorganic components, has a degree of fineness and a purity or substantial freedom from organics permitting it to be employed directly in various industrial applications, and following additional purification or beneficiation, especially enabling it to be recycled to glass manufacture.

More specifically, according to the process of the present invention for the recovery of glass from municipal waste, such waste is shredded, and the shredded waste is fed to and treated in an air classifier, recovering overhead lights including glass from the air classifier, the air classifier being operated under conditions such that the glass contained in the overhead light material or lights has a particle size generally smaller than about 6 mesh. Such overhead material from the air classifier is then screened to recover a screened material which is enriched in glass and containing substantially all of the glass of particle size less than about 6 mesh present in the overhead lights from the classifier. Such glass-enriched screened material is fed to and treated on an air table to separate out the major portion of the organics, and recover as product a material consisting essentially of fine glass having the aforementioned particle size less than about 6 mesh, and of substantially reduced organic content.

Thus, the present invention has as an essential novel feature the employment of that fraction of the material following shredding and which is taken off as overhead from the air classifie and then separated by screening into an enriched fine glass fraction, as the material which is subjected to separation on the air table into the above-noted fine glass product of reduced organi content. This feature of the invention which involves the isolation of the glass from the above screened mixture produced from the lights of the air classifier, by means of an air table, thus produces a fine glass of sufficient grade and degree of purity which can be employed for producing "Thixite" panels, understood to be composition glass and resin-binder sheets, slurry seal, which is a mixture of tar and glass used on asphalt roads for repair or filling holes therein, and a composition formed of bovine manure which has been baked and the residue thereof mixed with glass and fused to form lightweight paneling material.

In the initial processing step or shredding operation, the various components of the trash or waste are broken up into coarse pieces, the glass therein generally breaking into a size substantially finer than most of the other components. Thus, for example in a typical operation of this type, the glass will break into pieces of a size less than ½ inch, while a substantial portion of the other components, including metals, such as non-ferrous metals, stainless steel and the like, are in the form of massive pieces ranging in size upwards from about ½ inch, e.g. from about ½ inch to 12 inches in size.

Following the shredding operation, the shredded waste material including the glass is fed to an air classifier. Air classifiers are well known and are generally used in waste material recovery processes to separate light materials including combustibles, in the shredded waste, from the heavy materials, including non-combustibles, therein. Vertical air-column and rotary drum air classifiers are particularly suited for this purpose. The coarsely shredded mixed waste enters the classifier at a given location. As a result of combined gravity and aerodynamics action, lightweight materials, mostly combustibles, and a portion of the glass in the shredded waste, are discharged as overhead and are separately and pneumatically conveyed out of the classifier. The heavier materials, including most of the non-combustibles and a substantial proportion of the glass in the shredded waste, drop down and are removed at the lower end of the classifier. A typical illustration of an air classifier of the above type is disclosed in "Solid Waste Disposal," Volume 1, B. Baum and C. Parker, Ann Arbor Science Publishers Inc. 1973, page 1915.

The lightweight materials or overhead lights from the air classifier include organics such as paper, leaves, plastic, cardboard, and the like, and glass in varying proportions ranging from about 2.5 to about 8% by weight. It is noted that all percentage proportions set forth herein are by weight unless otherwise indicated. The proportion of such glass in the overhead lights typically ranges for example, from about 25 to about 40% of the total glass in the feed to the classifier. According to the invention, the air classifier is operated so that the glass present in the overhead lights is of fine particle size less than 6 mesh, with a substantial portion usually less than about 20 mesh size. The heavier materials which drop by gravity in the air classifier and generally including a major proportion of the glass in the shredded waste, e.g. ranging from about 50 to about 75% thereof, is comprised of glass particles of large size greater than 6 mesh, and up to 1 inch, or more. Such underflow also includes other inorganics such as relatively large size particles of rock, bricks, metal, and the like, massive organic materials such as wood and a minor proportion of other organics.

In one mode of operation, for example, the underflow of the air classifier can contain about 70% of the glass in the shredded waste, such glass being of large size, and the overhead lights from the classifier can contain about 30% of the glass in the shredded waste, such glass being of fine particle size as noted above.

The overhead lights from the air classifier is then screened to remove a substantial portion of organics and recover the major portion of the glass in the material, of a particle size less than about 6 mesh, thereby obtaining a screened material enriched in glass. Such screened material enriched in glass can contain, for example, from about 10 to about 65% by weight of glass, other inorganics such as dust and rock, and organic matter including for example paper, cardboard, lint, grass, and the like. Thus, for example, in one mode of operation such glass-enriched screened material can contain 50% glass of a particle size less than about 28 mesh, 20% other inorganics and 30% combustible organics, and in another typical mode of operation, such glass-enriched screened material can contain 25% glass of a particle size less than 8 mesh, 25% other inorganics such as dirt and rock, and about 50% fine organic matter of the nature noted above.

The glass-enriched screened overhead from the air classifier is then fed to an air table of a conventional type which separates the heavier materials in the feed material, including the glass and inorganics, from the lighter material, particularly organics. Essentially, a typical air table, also referred to as a gravity separator, basically can comprise a perforated platform which can have a series of riffles running lengthwise. The platform can be inclined in a single plane or in two planes. In operation, material is placed on the high point of the platform and the platform is vibrated in two directions. In one direction the vibrator has high acceleration and in the other direction a lower acceleration. Air is fed through the perforations to give the feed material a slight lift. The heavier material generally follows the riffles along the length of the table and falls off one end while the lighter material jumps the riffles and falls off another side of the table. It will be understood that various forms of air tables can be employed, examples of these being the Forsbergs Vacuum Gravity separator marketed by Forsbergs, Inc. and the Triple/S Dynamics separator marketed by Sutton, Inc.

Thus, upon feeding the glass-enriched screened waste material to the air table according to the invention, the air table separates out the heavies in the form of substantially all of the glass in the feed, other inorganics, and the lights consisting essentially of organics. Thus, in the practice of the present invention the air table produces a concentrated glass fraction consisting of a major portion, e.g. up to 90% or more, of glass, the amount of glass in such product usually ranging from about 40% to about 70%. The glass in such concentrated glass product has a mesh size less than 6 mesh, with a substantial portion, e.g. about 50% to about 90%, having a mesh size less than about 20 mesh, a minor portion of such glass, e.g. ranging from about 5% to about 20%, having a fineness less than about 48 mesh. The remainder of such concentrated glass fraction comprises about 20% to about 50% of other inorganics including rock chips, brick, and the like, and a minor amount of about 10% to about 20%, of organics.

Thus, the products produced or separated in the air table operation include the above-noted heavy fine glass product containing only a small amount of organics, which is the major desired product, an inorganic product including brick and rock chips, a dust product and a light organic product including paper, plastics, wood, dried corn and seeds, and the like. The heavy glass product generally comprises about 60 to about 65% by weight of the overall products obtained in the air table operation.

According to another feature of the invention, the light organics fraction obtained on the air table and containing a small amount of glass can be passed through a 48 mesh screen, to obtain organics of a particle size greater than 48 mesh, substantially free of glass and suitable for use, e.g. as a powdered fuel. The glass thus separated of a particle size less than 48 mesh and which is substantially free of organics also has utility for the purposes noted above.

The enriched glass product obtained from the air table, the glass particles of which are of fine size less than 6 mesh, preferably less than about 8 mesh, and of substantially reduced organic content, can be employed directly for construction applications or for other purposes. These include use of the glass fraction as a brick additive, for admixture with tar to form slurry seal used for repair of asphalt roads, for admixture with resin binder to produce construction sheets, and for admixture with the residue of baked cattle manure, and after further processing, for production of lightweight paneling material.

Of further significance and as a feature of the invention, such fine and relatively pure (organics-free) glass product recovered from the air table, and containing glass of a mesh size less than 6 mesh, alternatively can be subjected to purification operations to provide a glass of purity sufficient for recycle to glass manufacture, e.g. to produce a glass for addition to a container grade cullet. Thus, for example, the fine glass product recovered on the air table according to the invention, can be purified and recycled to glass manufacture according to the process described in the U.S. application of Booker W. Morey, et al, Ser. No. 172,888, filed Aug. 18, 1971, titled "Flotation Separation of Glass from a Mixture of Comminuted Inorganic Materials" now abandoned.

As an additional feature of the invention process, there can be employed an optional drying step prior to or between air classification and screening, for drying the overhead from the air classifier before screening such overhead material. Such drying aids in reducing the size of any lumps or aggregates of material in the overhead from the air classifier, and prevents the glass particles from sticking to the organic particles such as paper, and the like, to thus facilitate screening thereof.

The following are examples of practice of the invention, it being understood that such examples are illustrative and not limitative of the invention.

The examples below are described for greater clarity in conjunction with the accompanying drawing wherein.

EXAMPLE 1

Figure 1:
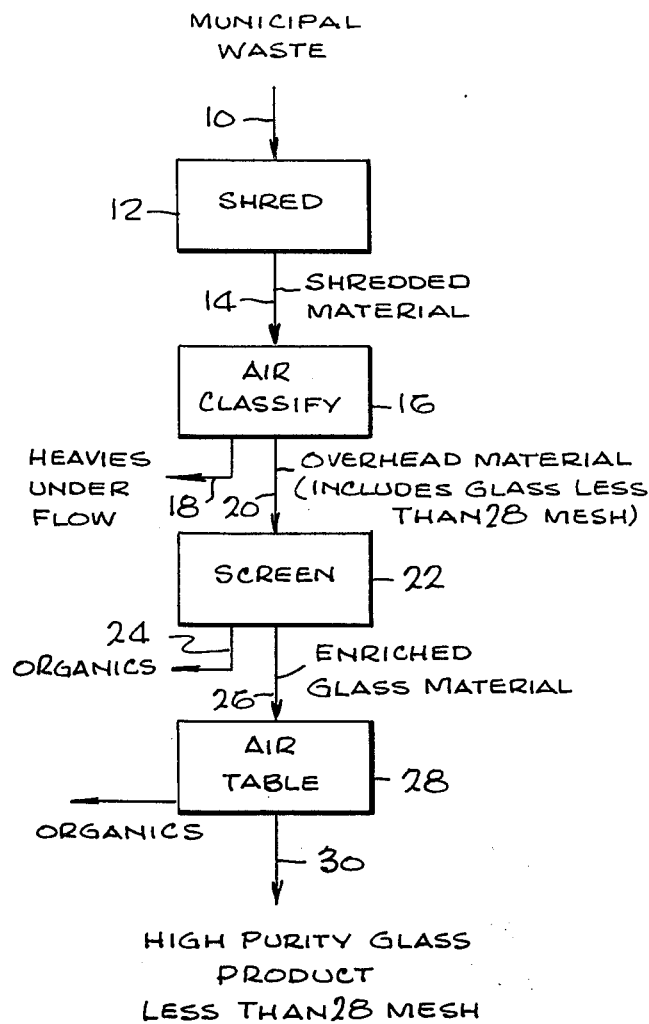
FIG. 1 is a block diagram illustrating the essential steps of the process.

Referring to FIG. 1 of the drawing, municipal waste or trash, indicated at 10, and containing 7 to 10% glass, is fed to a shredder to shred the material as indicated at 12. In the shredding operation the glass is broken into various size pieces generally less than about ½ inch while 80% or more of the other components are broken into pieces ranging in size from dust to 12 inches. Such other components include rock, metals, paper, cardboard, wood, plastics and the like.

The shredded material at 14 is then fed to an air classifier, as indicated at 16, and an overhead material 20 is recovered. Such overhead material includes about 4–6% of fine glass particles, 2–4% other inorganics including rock chips, brick and the like, and 60–70% of combustible organics including paper, cardboard, plastics and the like. The remainder is mostly water. The air classifier is operated so that the glass particles have a size less than 28 mesh.

The underflow or heavies from the air classifier, indicated at 18, is composed of about 70% of the glass contained in the waste material 10, but such glass particles are of a size larger than 28 mesh. Such heavies also include brick and rock chips, metals, and the like.

The overhead material at 20, including the fine glass particles comprising about 30% of the glass contained in the waste material 10 is then placed on a screen as indicated at 22, such screen being of 28 mesh size.

The screened product thus produced is essentially in the form of an enriched glass material consisting of about 50% glass of particle size less than 28 mesh, 20% other inorganics, including brick and rock chips, and 30% combustible organics, including paper, plastics, and the like. The material retained on the screen and of a particle size larger than 28 mesh, is essentially composed of organics and is separated as indicated at 24.

The enriched glass material 26 thus separated in the screening operation is fed to an air table as indicated at 28. The heavier glass particles are separated on the air table into a high purity glass product of particle size less than 28 mesh, as indicated at 30. There is also separated on the air table a dust product, a light inorganic product and an organic product. The high purity glass product at 30 consists of about 90% glass, the dust product containing less than 1% glass and the light inorganic product containing about 13% glass. The recovery of glass in the glass product is about 80% of the glass in the enriched glass material fed to the air table.

The grade of glass thus produced is sufficient for industrial application including use as an additive for bricks or for the production of "Thixite" panels or slurry seal.

EXAMPLE 2

Figure 2:
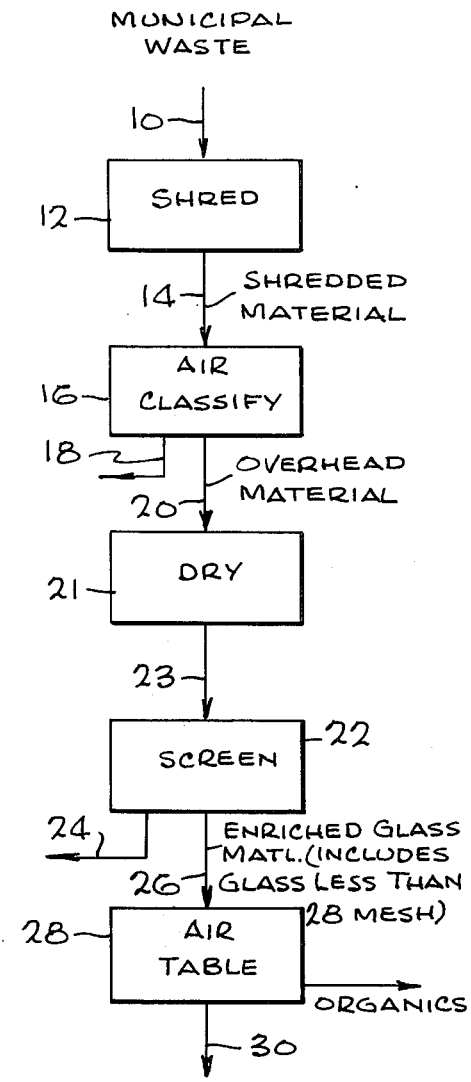
FIG. 2 is a block diagram similar to FIG. 1 but including an optional step in the process.

The procedure of Example 1 is repeated, except that as indicated in FIG. 2 of the drawing, following the air classifier operation at 16, the overhead material 20 containing fine glass particles is dried as indicated at 21, and the dried material at 23 is then fed to the screen 22.

Results similar to those of Example 1 are obtained.

EXAMPLE 3

A feed material was derived from shredding municipal trash in an Eidal 1000 Shredder. The shredded material was air classified, the overhead fraction was dried and then screened at 8 mesh. The fine material passing through the screen had the characteristics shown in table 1 below:

Table 1

| Fraction Mesh Size | −8 Mesh AC Overheads | | | | | |
|---|---|---|---|---|---|---|
| | Wt.% | % Ash | % Inerts | % Organics | % Glass | % Glass Distribution |
| Overall Composition | | 6.23 | 44.85 | 52.3 | 32.7 | |
| −8 + 10 | 12.6 | 10.7 | 15.8 | | 8.65 | 3.2 |
| −10 + 12 | 4.7 | 9.0 | 28.9 | | 21.9 | 3.2 |
| −12 + 20 | 18.4 | 6.1 | 45.9 | | 31.2 | 17.0 |
| −20 + 48 | 40.5 | 5.4 | 54.3 | | 42.9 | 51.0 |
| −48 + 60 | 5.8 | 3.8 | 64.9 | | 39.6 | 6.4 |
| −60 + 100 | 7.9 | 6.3 | 55.2 | | 31.4 | 7.1 |
| −100 + 200 | 5.8 | 7.3 | 50.7 | | 22.8 | 3.9 |
| −200 | 4.2 | | | | | |

It is seen from Table 1 above that a substantial portion, about 64%, of the glass-enriched screened product was of a size less than 20 mesh.

Figure 3:
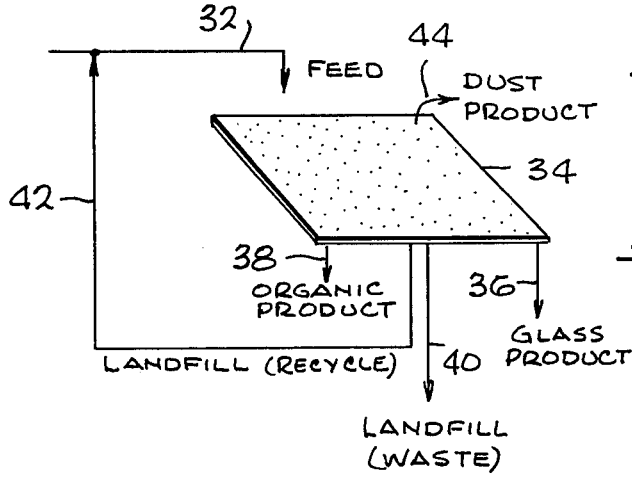
FIG. 3 is a schematic illustration of the distribution of the products recovered from an air table, according to one embodiment of the invention.

The glass-enriched screened material passing through the 8 mesh screen and having the characteristics noted in Table 1 above, was fed to an air table of the above-noted Triple/S type and distributed itself among four products as illustrated in FIG. 3 of the drawing. It will be noted that the major portion of the feed at 32, to the air table indicated at 34, was comprised of glass product, 64.4% of the feed, and was removed at 36 from one end of the table. The organic product in the amount of 21.4% of the feed was removed at 38 at the other end of the table. A landfill waste type product, in the amount of 11.8%, was removed at 40, intermediate the ends of the table, and a substantially equal amount of landfill material removed at 42 was recycled and added to the feed. 2.4% of a dust product was also removed at 44 from the air stream passing through the table.

The characteristics of each of the products obtained from the air table operation is shown in Table 2 below.

In Table 2, the legend "LOI" designates "loss on ignition," and is a measure of the organics present in each of the products from the air table.

Table 2

| Fraction | Weight % | % LOI | % Glass |
|---|---|---|---|
| Dust | 2.4 | 54 | 3.9 |
| Heavy | 64.4 | 15.6 | 41.5 |
| Organic Recycle | 21.4 | 62.4 | 10.3 |
| Landfill | 23.6 | 57.7 | 16. |

From Table 2 above, it is clearly evident that the major portion of the glass in the feed to the air table is present in the heavy glass product removed at 36. Such heavy fraction is suitable for the above-noted industrial uses, namely as an additive for bricks, production of "Thixite" panels, slurry seal, and the like. Alternatively, such heavy fraction product is suitable as a feed for beneficiation to a container grade cullet, preferably according to the process disclosed in above copending application Ser. No. 172,888. The dust and organic fractions are suitable as pyrolysis feed or as a powdered fuel. Alternatively, the organic fraction at 38 can be purified further by screening at an appropriate size indicated by the screen analysis of Table 3 below:

Table 3

| | Screen Analysis of Air Table Organic Fraction | | | |
|---|---|---|---|---|
| Screen Size | wt % | % LOI | Cumulative wt% × LOI | % Inerts |
| +10 | 9.1 | 78.7 | 11.4 | 2.5 |
| −10 + 12 | 6.9 | 79.7 | 20.17 | 3.2 |
| −12 + 20 | 23.7 | 80.0 | 50.46 | 2.9 |
| −20 + 48 | 36.9 | 75.4 | 94.9 | 8.2 |
| −48 + 60 | 7.2 | 22.9 | 97.5 | 75.3 |
| −60 + 100 | 13.6 | 6.6 | 98.95 | 92.6 |
| −100 + 200 | 2.1 | 22.7 | 99.7 | 71.3 |
| −200 | | 25 | 100 | |

From Table 3 above, it is noted that with particle sizes less than 48 mesh, most of the glass passes through the screen and is separated from the organics. As a matter of fact, some 95% of the combustible portion of the organic fraction is larger than 48 mesh size, reducing the inerts from 22% to about 5.4%. The fraction of particle size less than 48 mesh and containing the major portion of the glass has only about 22% LOI, indicating very little organics.

The mesh sizes set forth herein are based on Tyler standard screen scale.

From the foregoing, it is seen that the invention provides novel procedure for producing an improved novel glass recovery product from municipal waste and trash, such improved glass product having particles of sufficiently fine size and being of a grade so that the product can be employed directly in valuable industrial applications without any intermediate grinding or purification procedure required, and when the product is of sufficiently fine size and is further purified, such glass product can be recycled directly to glass manufacture.

While I have described particular embodiments of my invention for purposes of illustration, it is understood that other modifications and variations will occur to those skilled in the art, and the invention accordingly is not to be taken as limited except by the scope of the appended claims.

I claim:

1. In a process for the recovery of glass from municipal waste, including the steps of shredding said waste, subjecting said shredded waste to treatment in an air classifier, recovering a portion of the resulting air classified shredded waste containing glass, and subjecting said recovered portion of shredded waste to treatment on an air table; the improvement which comprises the steps of recovering the overhead material including glass from said air classifier, said air classifier being operated under conditions such that the glass contained in said overhead material has a particle size smaller than about 6 mesh, screening said overhead material obtained from said air classifier, recovering a screened material enriched in glass and subjecting said screened material to treatment on an air table and recovering as first product a material consisting essentially of fine glass having a particle size less than about 6 mesh and of substantially reduced organics content, and as additional products other inorganics and organics.

2. A process as defined in claim 1, said overhead material from said air classifier including glass containing a substantial portion of glass particles of a size less than about 20 mesh, and said screened material enriched in glass containing a substantial portion of said glass particles of a size less than about 20 mesh, other inorganics, and organics.

3. A process as defined in claim 1, said first product from said air table being heavies consisting essentially of fine glass containing a substantial portion of glass particles of a size less than about 20 mesh.

4. A process as defined in claim 1, said overhead material from said air classifier containing about 2.5 to about 8% of glass by weight of said material.

5. A process as defined in claim 2, said overhead material from said air classifier containing about 2.5 to about 8% of glass by weight of said material.

6. A process as defined in claim 1, said overhead material from said air classifier being enriched in glass to from about 10% to about 65% by weight of glass.

7. A method as defined in claim 4, said first product from said air table containing about 40 to about 70% glass of a particle size less than about 6 mesh.

8. A process as defined in claim 1, wherein said screened material is subjected to treatment on said air table to recover as first product from said air table a material consisting essentially of up to about 90% glass of a particle size less than about 28 mesh.

9. A process as defined in claim 1, the underflow of said air classifier containing about 70% of the glass in said shredded waste and said overhead material from said classifier containing about 30% of the glass in said shredded waste.

10. A process as defined in claim 7, the underflow of said air classifier containing about 70% of the glass in said shredded waste and said overhead materials from said classifier containing about 30% of the glass in said shredded waste.

11. A process as defined in claim 1, including drying said overhead lights from said air classifier prior to screening.

12. A process as defined in claim 1, including recovering organics from the screened material fed to said air table, said organics containing a small amount of glass, screening said organics to separate said glass and recovering an organic product substantially free of glass, and a glass product substantially free of organics.

13. The process for the recovery of glass from municipal waste, which comprises shredding said waste to produce glass generally having a particle size less than about ½ inch, subjecting said shredded waste containing said glass to treatment in an air classifier, recovering the overhead material from said air classifier including glass in the form of particles of a size less than 6 mesh, screening said overhead material obtained from said air classifier, removing a substantial portion of organics and recovering a screened material enriched in glass, subjecting said screened material to treatment on an air table and recovering a glass product consisting essentially of fine glass.

14. A process as defined in claim 13, said screened overhead material from said air classifier enriched in glass to about 10% to about 65% of said material, said glass product from said air table containing glass in an amount ranging from about 40% to about 70% by weight, and recovering as additional products from said air table other inorganics, and organics.

15. A process as defined in claim 13, the underflow of said air classifier containing about 70% of the glass in said shredded waste and said overhead material from said classifier containing about 30% of the glass in said shredded waste.

16. A process as defined in claim 14, including recovering organics from the material fed to said air table, said organics containing a small amount of glass, screening said organics to separate said glass and recovering an organic product substantially free of glass.

17. The process as defined in claim 13, including drying said overhead material obtained from said air classifier prior to screening said overhead material.

* * * * *